United States Patent [19]
Fulcher et al.

[11] Patent Number: 5,928,072
[45] Date of Patent: Jul. 27, 1999

[54] WATER BASED CRAB MEAT EXTRACTION PROCESS WITH WATER RECIRCULATION

[75] Inventors: Garland Christopher Fulcher, 105 Norman Cir., Oriental, N.C. 28571; Walter Franklin Lubkin, Jr., Beaufort, S.C.

[73] Assignees: Garland Christopher Fulcher, Oriental, N.C.; Walter F. Lubkin, Beaufort, S.C.

[21] Appl. No.: 09/086,464

[22] Filed: May 28, 1998

[51] Int. Cl.⁶ .................................................. A22C 29/00
[52] U.S. Cl. ...................................... 452/1; 452/7
[58] Field of Search ........................ 452/1, 7, 10

[56] References Cited

U.S. PATENT DOCUMENTS

| | | | |
|---|---|---|---|
| 2,545,517 | 3/1951 | Harris, et al. | 452/1 |
| 2,784,447 | 3/1957 | Thompson et al. | 452/1 |
| 2,879,538 | 3/1959 | Peuss | 452/1 |
| 2,929,502 | 3/1960 | Harris | 452/1 |
| 3,596,310 | 8/1971 | Tolley | 452/1 |
| 3,597,792 | 8/1971 | Lockerby . | |
| 3,719,967 | 3/1973 | Craig . | |
| 4,202,076 | 5/1980 | Rancatore . | |
| 4,503,586 | 3/1985 | Lockerby et al. | 452/1 |
| 4,523,349 | 6/1985 | Warren . | |
| 4,688,679 | 8/1987 | Lindgren | 452/1 |
| 4,752,988 | 6/1988 | Gugliemo et al. . | |
| 4,817,243 | 4/1989 | Esposito . | |
| 5,011,453 | 4/1991 | Lapeyre et al. . | |
| 5,149,294 | 9/1992 | Storesund . | |
| 5,154,662 | 10/1992 | Moritz, Sr. et al. . | |
| 5,580,303 | 12/1996 | Winslow et al. | 452/1 |

*Primary Examiner*—Willis Little
*Attorney, Agent, or Firm*—Hardaway/Man IP Group; Nexsen Pruet Jacobs & Pollard, LLP

[57] ABSTRACT

An apparatus and a process for extracting crustacean meat from shells is provided. The extracting method is based on mechanical separation utilizing heated water spray within a rotating drum assembly for removal and separation of meat from shells. The water is collected, pumped to a holding tank, and is flavored with natural crab extract for recycle within the process. The apparatus includes a hammer mill for fracturing shells, a heated water bath for separating fractured shells from meat, an inclined rotating drum assembly having perforated walls and an internally located nozzle dispensing a water spray for separating meat from fractured shells, a tank having at least one water jet for separating meat from shell fragments, a vibrating dewatering apparatus for separating meat from the water, and a recirculation system for collecting, reheating, and reusing the solution of water and crab extract. The apparatus and process provides bone free crustacean meat that retains the natural crab flavor and has a low bacteria count.

19 Claims, 7 Drawing Sheets

WATER BASED CRAB MEAT EXTRACTION PROCESS WITH WATER RECIRCULATION

BACKGROUND OF THE INVENTION

This invention relates generally to the art of removing meat from crustaceans, and more particularly to an apparatus and a process for cleaning and separating crab meat from crab shells.

Conventional extractors and extraction processes exist which provide methods for removal of meat from crustacean shells, with varying success and varying labor requirements. In U.S. Pat. No. 5,154,662, to Moritz et al., an apparatus is disclosed that separates meat from crab shells by rolling and pinching the crab shells with screening to remove the meat. In U.S. Pat. No. 5,149,294, to Storesund, an apparatus is disclosed that separates meat from crab shells by spinning spindles using centrifugal force. In U.S. Pat. No. 5,011,453, to Lapeyre et al., an apparatus is disclosed which removes meat from crab shells by a centrifugal force provided by a rotating drum. In U.S. Pat. No. 4,817,243, to Esposito, an apparatus is disclosed which provides an enclosure for hand washing and cutting away crab shell from crab meat, with a water discharge provided to remove meat from crayfish tails. In U.S. Pat. No. 4,752,988, to Guglielmo et al., a process is disclosed for centrifugal extraction of meat, with brushing of crab body parts with a water jet. In U.S. Pat. No. 4,523,349, to Warren, an apparatus is disclosed for breaking crab shells and separating the meat by a pincher mechanism. In U.S. Pat. No. 4,202,076, to Rancatore, an apparatus is disclosed which provides suction to remove meat from crab shells. In U.S. Pat. No. 3,719,967, to Craig, an apparatus is disclosed for cutting meat from crab shell by spinning discs. In U.S. Pat. No. 3,597,792, to Lockerby, et al., an apparatus for extraction of crab meat is disclosed for the use of a rotating spindle to centrifugally remove meat from crab shells.

These prior art devices all are adequate for their intended function, but room exists for other devices which will provide a process for removing and cleaning the crab meat while preserving the natural crab meat flavor.

SUMMARY OF THE INVENTION

It is an object of the invention to provide an apparatus that removes meat from shells, providing bone free meat.

It is a further object of the invention to provide a process that removes meat from shells utilizing a heated water spray.

It is a further and more particular object of the invention to provide an apparatus which provides a mechanical separation of meat from bone particles.

It is yet a further and more particular object of the invention to provide a meat separation process that retains the meat flavor.

It is an additional object of this invention to provide a separation process that produces boneless crab meat with a low bacteria count.

It is an additional and more particular object of this invention to provide a separation process that utilizes recirculated, heated water.

It is a further and additional object of this invention to provide a separation process that operates with no significant wastage of the water.

It is additionally an object to provide a separation process that utilizes a heated water that contains natural crab extract.

These and other objects of the invention are accomplished by an apparatus for separating meat from shells comprising a rotating drum, a water spray process, a separator tank, and a dewatering process. The water spray process provides heated, pressurized, crab meat flavored water for separating crab meat from crab bones, with recovery and recirculation of the heated flavored water.

DETAILED DESCRIPTION

In accordance with this invention, it has been found that an improved method of extracting crab meat is attained by the utilization of heated water spray and mechanical separation methods for producing a bone free meat. It has been found that separation of crab meat from crab shells is accomplished with the crab meat retaining its natural crab flavor while having a low bacteria count. Various other advantages and features of this invention will become apparent from a reading of the following description given with reference to the various figures and drawings.

Figure 1:
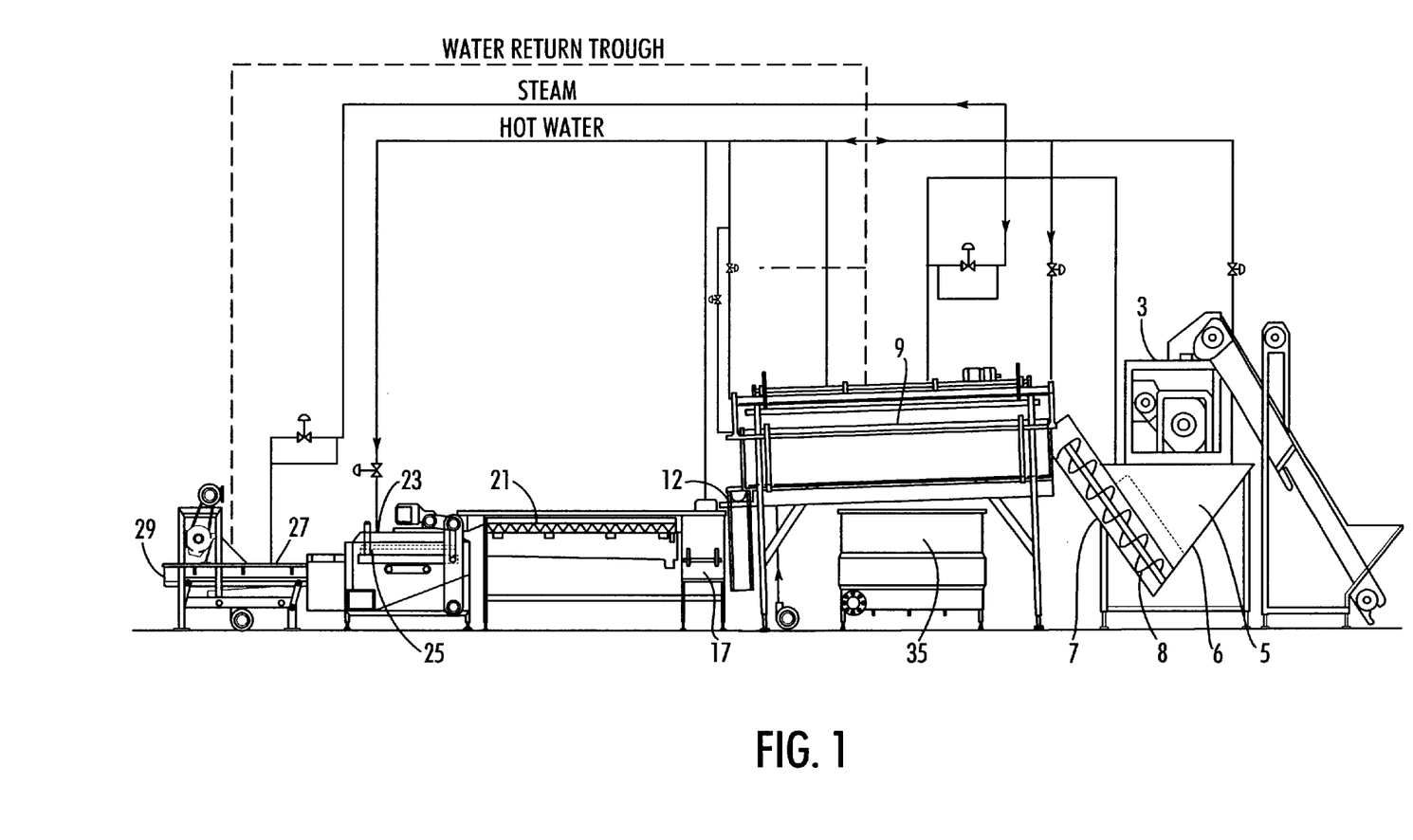
FIG. 1 is a schematic side view of the components of this invention operatively.
Figure 2:
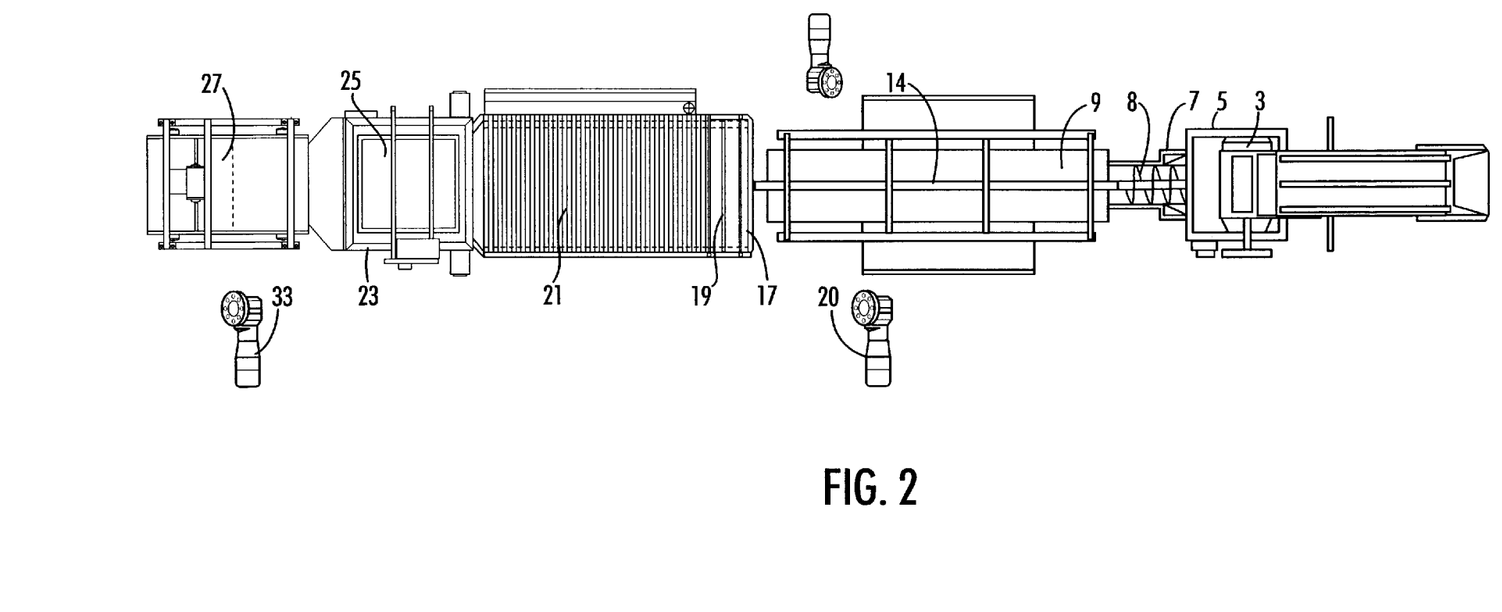
FIG. 2 is a top view of the components of this invention.

In the preferred embodiment of the invention, as shown in FIGS. 1 and 2, cooked crab parts 1 are placed in a shell crusher, chopper, hammer mill 3, or similar means for cracking crab parts 1. The hammer mill 3 breaks and separates the larger crab parts into fractured crab meat pieces 4. The fractured crab meat pieces 4 fall into a hot water bath 5 with inclined walls 6, the water temperature of the bath 5 being approximately 150 degrees fahrenheit. Bath 5 is connected to an inclined jacketed tank 7 and an auger lift 8 positioned at the lowermost point of bath 5 and of tank 7. The fractured crab meat pieces 4 sink to the bottom of the bath 5, along the inclined walls 6. The meat pieces 4 are transported from the lower point of tank 7, by auger lift 8 to an inclined rotating drum 9 (FIG. 1). The inclined rotating drum 9 has perforations 11 in the drum walls approximately one quarter inch holes in diameter. Perforations 11 allow crab meat to pass through, and separate and retain the larger shell pieces within drum 9. The larger shell pieces fall out of the lower open end of the rotating drum into a sluice that delivers the shell pieces to a waste container 12.

Figure 3:
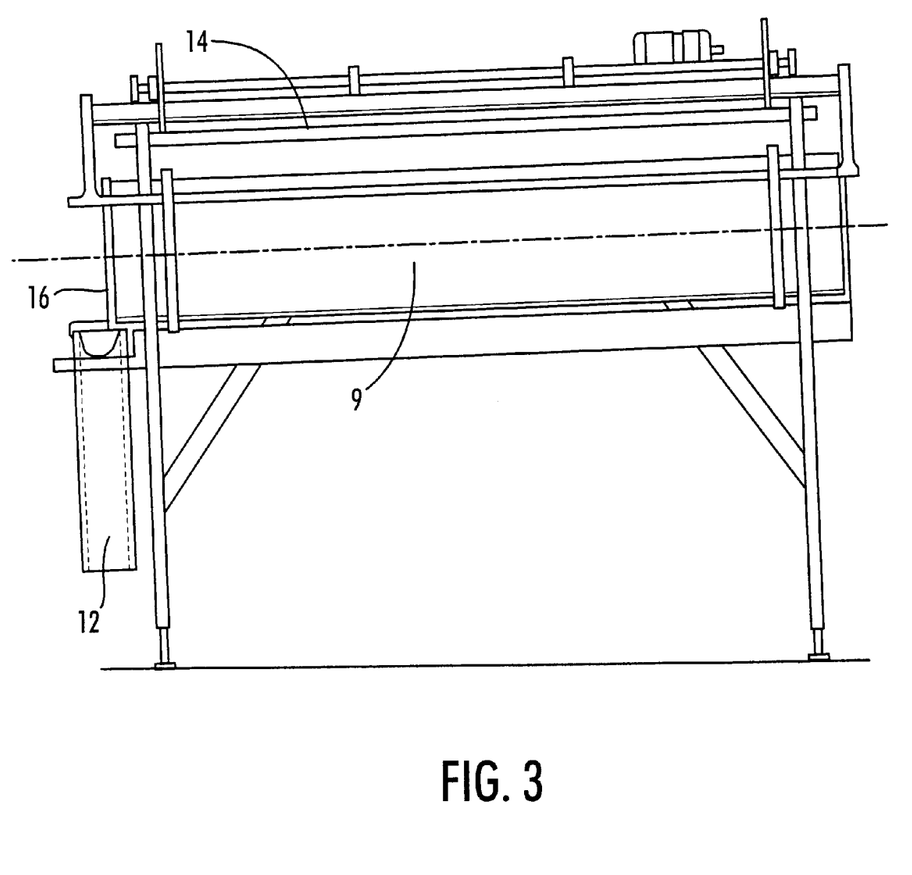
FIG. 3 is a schematic side view of the rotating drum for this invention.
Figure 4:
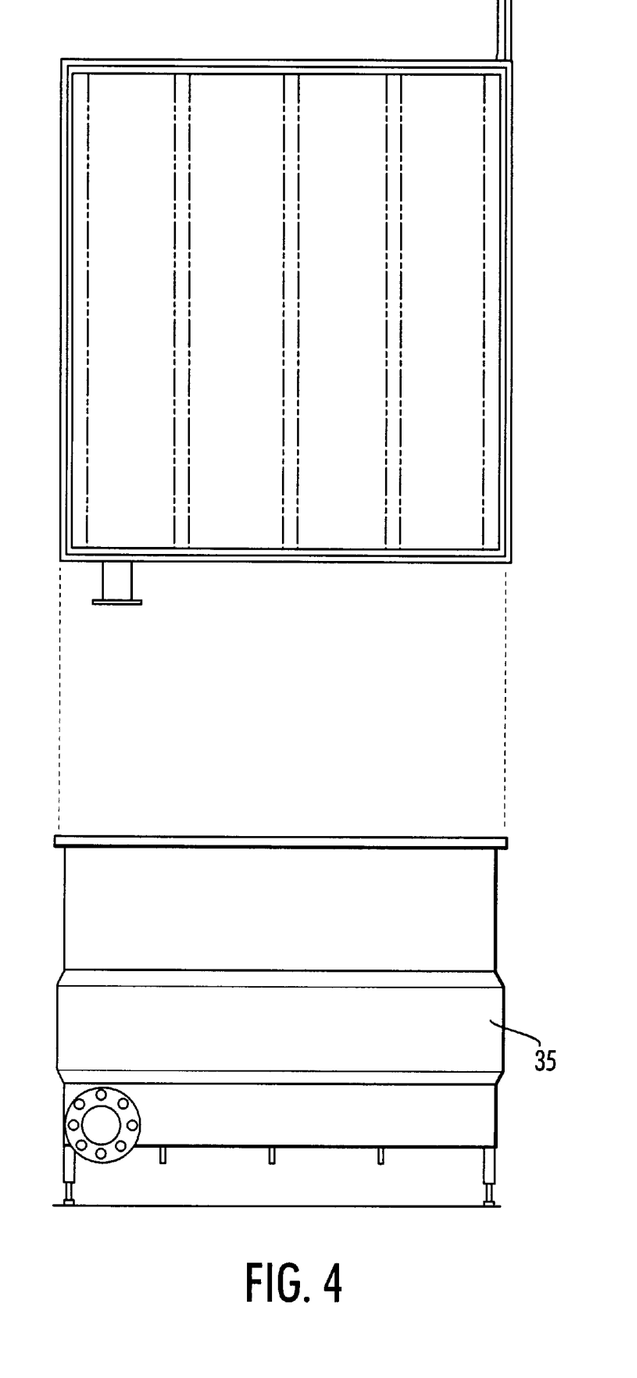
FIG. 4 is a schematic side and top view of the heated water recycle tank of this invention.
Figure 5:
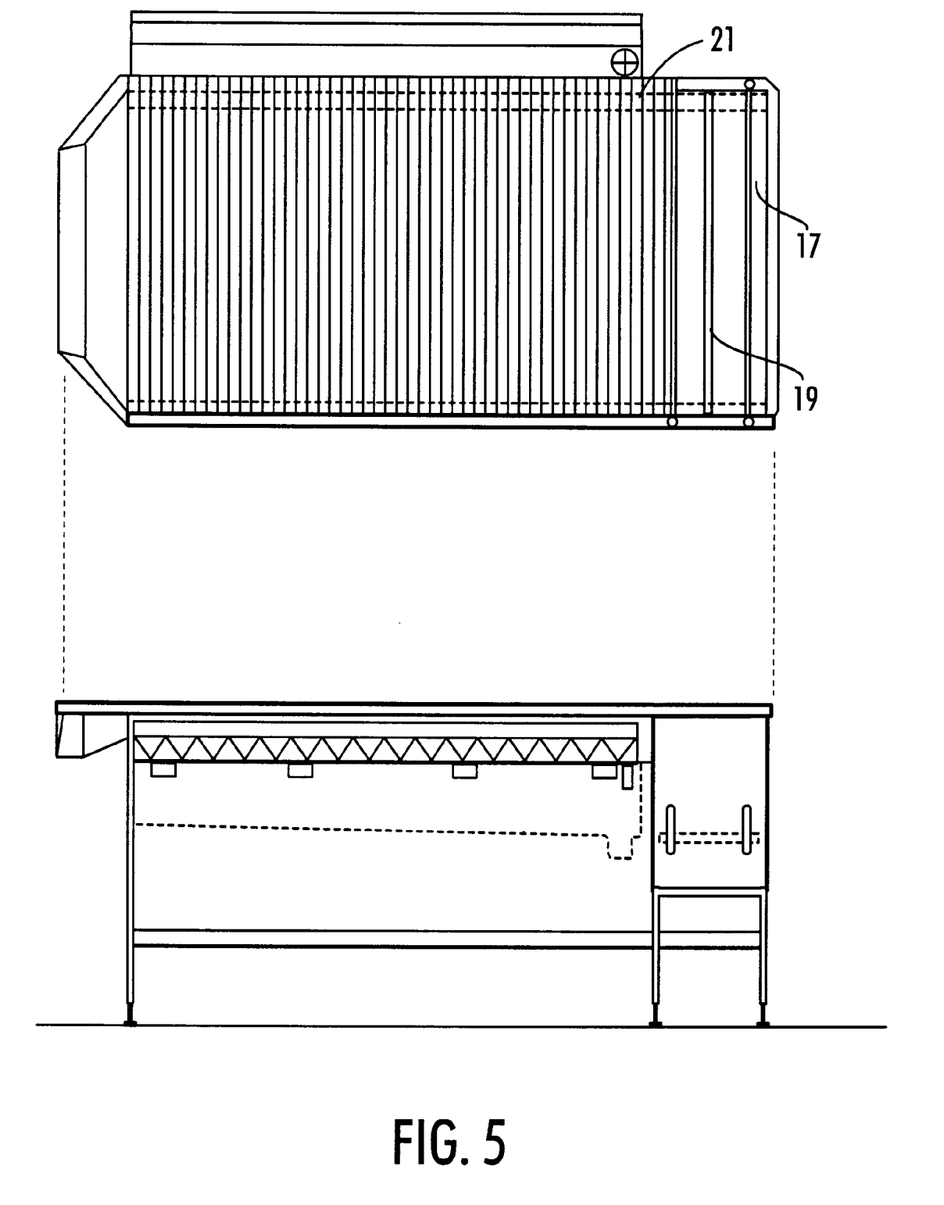
FIG. 5 is a schematic side and top view of the first separation tank and horizontal sluice tank.
Figure 6:
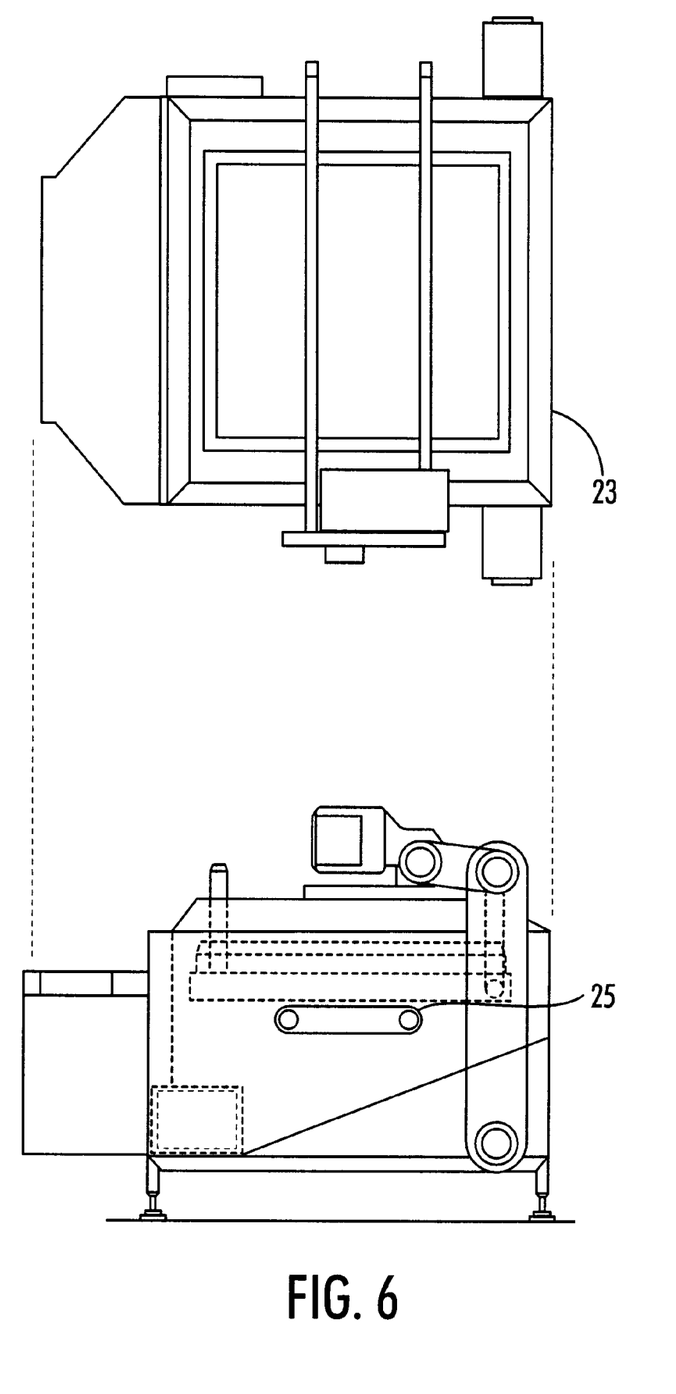
FIG. 6 is a schematic side and top view of the second separation tank and the reciprocating pan.
Figure 7:
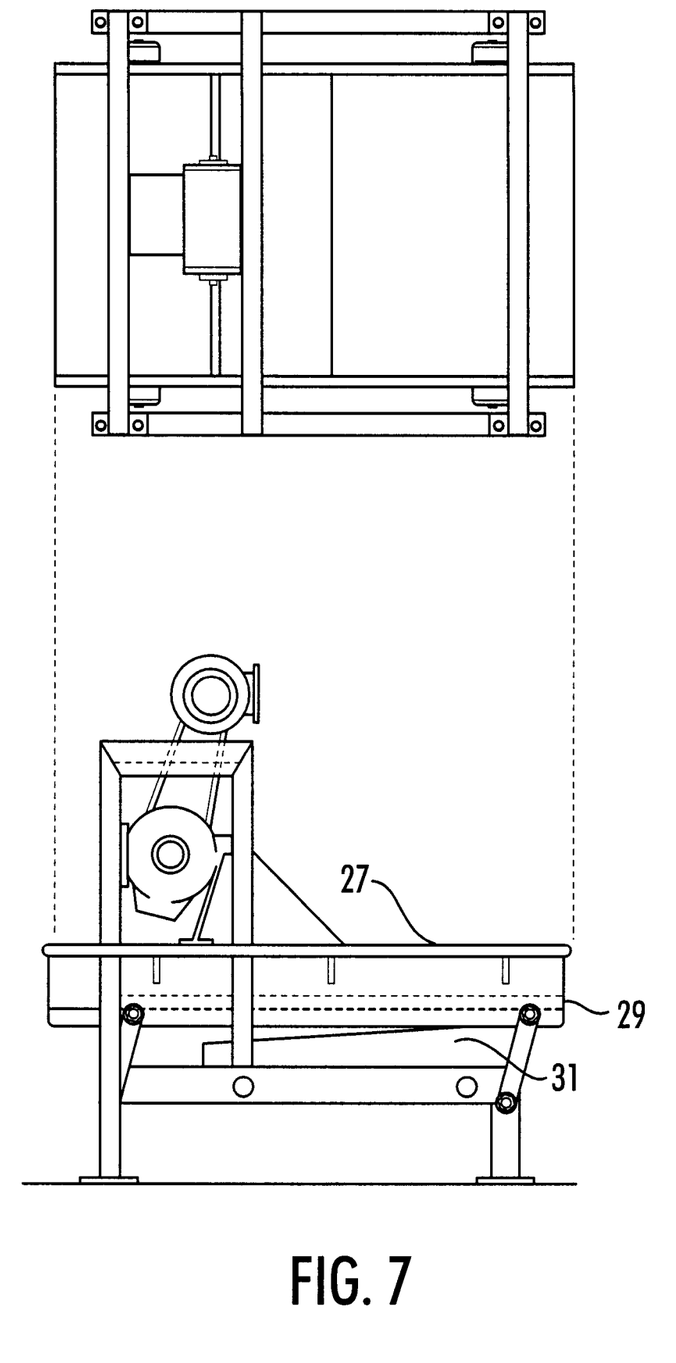
FIG. 7 is a schematic side and top view of the vibrating dewatering screen, meat catch pan, and water catch basin.

Inside the rotating drum 9 is a plurality of water spray jets or nozzles 13 connected to a central spray pipe 14 located in the upper area of the inside of the rotating drum 9. Jets 13 and spray pipe 14 receive heated water 10 from a main holding tank 35 which provides water heated to approximately 150 degrees fahrenheit. Jets 13 dispense heated water 10 onto the fractured meat pieces 4 within the rotating drum 9. Jets 13 separate the shells from the meat pieces 4 by pressure washing the crab meat from the shells. The shells move down the inclined rotating drum 9 while meat pieces 4 and water 10 pass through perforations 11 in the rotating drum 9 (FIG. 3). The fractured crab shells, without the crab meat pieces 4, are rotated down the inclined drum 9 for delivery into a waste container 12 (FIG. 1).

The separated crab meat 15 and heated water 10 fall from the inclined drum 9 and into a sluice jacket 16 that flows into a first water separation tank 17 located between the rotating drum 9 and a horizontal rippled sluice 21. Tank 17 has a partition 19 placed along the width of the tank 17. Tank 17 includes a plurality of water jets or nozzles 18 directed towards partition 19 to force the pieces of separated crab meat 15 under the partition 19 (FIG. 2). The crab meat 15 and heated water 10 then move on to a horizontal, grooved or rippled sluice tank 21. The grooves or ripples in the floor of the sluice tank 21 allow any remaining bone particles to sink to the bottom of the grooves of the sluice tank 21.

The separated meat 15 and heated water 10 mixture is directed to a second separation water tank 23 which has a perforated pan 25 that is reciprocated up and down by conventional mechanical activators. The separated meat 15 is forced through the perforations in the perforated pan 25 by the up and down reciprocating motions of the pan 25. Any light weight bone or filament pieces fail to pass through the perforations and remain in the perforated pan 25.

The separated meat 15 and heated water 10 spill from perforated pan 25 onto a vibrating dewatering screen 27 that separates the water 10 from the crab meat 15. The crab meat 15 vibrates off dewatering screen 27 and is caught by a perforated meat catch pan 29. The water 10 passes through screen 27 and is captured in a water collection pan 31. Collection pan 31 is connected by appropriate plumbing to a pump 33, with the water collected in collection pan 31 pumped to a main holding tank 35. The water in holding tank 35 is maintained at approximately 150 degrees fahrenheit by steam heating or other appropriate methods of heating water. At the holding tank 35, crab flavor extract 37 is mixed with the heated water to provide for a constant supply of recirculating water that contains a natural crab extract flavor. An anti-foaming agent 39 (not shown) is added intermittently by hand to the heated water 10 to reduce the foam produced when crab flavor extract 37 is circulated with the heated water 10.

Pump 33 provides recirculation of the heated water 10 crab extract 37, and anti-foaming agent 39, after collection at water collection points along the process, namely at water bath 5, at inclined rotating drum 9, at horizontal sluice tank 21, at vibrating dewatering screen 27, and at water catch basin 31. Collection of the water 10 and crab extract 37 solution allows for constant recirculation and reuse of the water 10, minimizing loss of solution. Any standard plumbing features may be added to the invention. For example, valves could be used to control the flow of water in the system. Also, all water jets and water intake lines are fed from the water holding tank 35. The water 10 is reheated in the holding tank 35 to approximately 150 degrees fahrenheit, and crab flavor extract 37 and anti-foaming agent 39 (not shown) are added to the heated water 10 by periodic introduction of specific volumes of extract 37 and anti-foaming agent 39 by hand or by mechanical addition.

Other meat separation processes in the crab meat industry utilize cold fresh water, or cold salt water for washing and separating shells from crab meat. The use of cold fresh water washes the crab flavor out of the meat during processing.

The addition of natural crab extract 37 to the heated water 10, permits the retention of natural crab flavor in the crab meat during the extraction of meat from shells and during the processing of meat to remove cartilage and non-meat components. The heated water 10 with natural crab extract 37 and anti-foaming agent 39 is recirculated to the water bath 5, the rotating drum 9, water jets 13, water tank 17, and to separation water tank 23, providing a constant flow of heated water 10 and natural crab extract 37 for extracting and processing the meat.

The extraction and processing by conventional crab meat apparatuses and methods occur at room temperature. Processing of crab meat at room temperature promotes unwanted bacterial growth. The resulting additional growth of bacteria during conventional crab meat processing reduces the shelf life of the final product.

For the apparatus and process of the present invention, the use of heated water 10 of approximately 150 degrees fahrenheit is maintained throughout the process, providing for reduction in bacteria from the crab shell and other parts processed with the crab meat. The meat processed by the present invention provides low plate counts of bacteria, when tested by standard industry procedures for plate counting of bacteria. The low bacteria plate counts of meat processed by the current invention typifies diminished residual bacteria in the meat. Low bacteria plate counts for tested meats provide for extended refrigerated shelf life for meats processed by the current invention.

It is thus seen that the invention provides for an apparatus and a process for separation of crustacean meat from shells. The process separates the meat from shells, cleans the crab meat with heated water having natural crab extract with minimal loss of crab meat flavor, and provides for recycle of the heated flavored water. Many variations will undoubtedly become apparent to one skilled in the art upon a reading of the above specification with reference to the drawings. As the foregoing description is exemplary in nature, the spirit and scope of the appended claims should not be limited to the description of the preferred versions contained herein.

What is claimed is:

1. An apparatus for extracting meat from crustacean shells comprising:

a hammer mill for fracturing said shells having meat therein;

a solution bath for receiving said fractured shells from said hammer mill;

an auger for removing said fractured shells from said solution bath;

a drum assembly for receiving said fractured shells from said auger, comprising:

a rotating drum having a plurality of perforations therein to allow said meat and said solution to pass therethrough while retaining said fractured shells; and a nozzle for dispensing solution into the drum to separate said meat from said fractured shells;

a separation assembly operatively connected to said drum assembly for receiving said meat and said solution, said separation assembly segregating said meat from said solution;

a solution holding tank fluidically connected to said separation assembly for receiving said solution from said separation assembly and from said drum assembly, and for supplying said solution to said drum assembly; and at least one pump for transporting said solution from said separation assembly to said holding tank, and from said holding tank to said drum assembly.

2. The apparatus for extracting meat as recited in claim 1, wherein said holding tank further comprises a heating element capable of warming said solution to a temperature of approximately 150 degrees fahrenheit.

3. The apparatus for extracting meat as recited in claim 1, wherein the solution bath further comprises an inclined tank having a lowermost point, wherein said auger is positioned at said lowermost point of said inclined tank.

4. The apparatus for extracting meat as recited in claim 1, wherein said drum assembly is inclined, with a first elevated end associated with said auger and a second lower end operatively associated with said separation assembly.

5. The apparatus for extracting meat as recited in claim 1, wherein said plurality of perforations in said rotating drum are approximately one quarter inch in diameter.

6. The apparatus for extracting meat as recited in claim 1, wherein said nozzle is positioned inside said rotating drum, and said drum assembly further comprises a sluice jacket positioned around a lower portion of said rotating drum, said sluice jacket collecting solution from said nozzle.

7. The apparatus for extracting meat as recited in claim 1, wherein said separation assembly further comprises:

a first separation tank having a partition partially submerged in said separation tank;

at least one jet associated with said partition, said jet adapted to direct said solution and said meat underneath said partition;

a sluice tank operatively connected to said first separation tank;

a second separation tank operatively connected to said sluice tank, said second tank having:
  a perforated reciprocating pan receiving said meat and said solution from said sluice tank;
  a vibrating dewatering screen for accepting said meat and said solution from said reciprocating pan;
  a perforated catch pan operatively associated with said second separation tank, said catch pan located below said vibrating dewatering screen; and
  a solution catch basin located below said perforated catch pan.

8. The apparatus for extracting meat as recited in claim 7, wherein said sluice tank further comprises a grooved inclined surface for allowing a continuous flow of said meat and said solution across said surface from a first elevated end to a second lower end of said sluice tank.

9. The apparatus for extracting meat as recited in claim 1, wherein said solution holding tank further comprises a means for dispensing crab extract into said solution holding tank, said solution being a combination of water and crab extract.

10. A process for extracting meat from crustacean shells comprising the steps of:

fracturing said crustacean shells containing meat;

washing said fractured shells and said meat with a solution;

removing said meat from said fractured shells;

segregating said separated meat and said solution from said fractured shells;

separating said meat from said solution, collecting said solution; and recirculating said solution from said collecting step to said washing step.

11. The process for extracting meat as recited in claim 10, wherein said fracturing step further comprises providing a hammer mill, said hammer mill fracturing said crustacean shells.

12. The process for extracting meat as recited in claim 10, wherein said washing step comprises washing said fractured shells and said meat with a solution heated to approximately 150° F.

13. The process for extracting meat as recited in claim 10, wherein said meat removing step further comprises providing a drum assembly, said drum assembly receiving said fractured shells and said meat from said washing step.

14. The process for extracting meat as recited in claim 13, wherein said meat removing step further comprises:

providing a rotating drum;

providing a nozzle inside said rotating drum; and providing a solution to said nozzle, wherein said nozzle directs said solution at said fractured shells and said meat.

15. The process for extracting meat as recited in claim 14, wherein the step of providing a rotating drum further comprises providing walls of said drum having a plurality of holes of approximately one fourth inch diameter, wherein said nozzle directs said solution at said fractured shells and said meat, forcing said solution and said meat through said holes, said solution and said meat exiting said rotating drum.

16. The process for extracting meat as recited in claim 10, wherein said segregating step further comprises:

providing a first separating step having a first tank receiving said meat, said fractured shell fragments, and said solution from said removing step;

providing a sluice tank, said sluice tank separating said meat and said solution from said fractured shell fragments; and providing a second separating step having a second tank receiving said meat and said solution from said step of providing said sluice tank.

17. The process for extracting meat as recited in claim 16, wherein said second separating step further comprises separating said meat from said solution by the steps of:

reciprocating a perforated pan containing meat and solution;

vibrating a screen, said screen collecting meat; and providing a container underneath said vibrating screen, said container collecting solution.

18. The process for extracting meat as recited in claim 10, wherein said recirculating step further comprises:

collecting solution from said washing step, said removing step, said segregating step, said separating step, and said collecting step;

providing piping for said solution to a holding tank;

reheating said solution in said holding tank to approximately 150 degrees fahrenheit;

mixing crab extract into said reheated solution;

dispensing said reheated solution to said washing step; and dispensing said reheated solution to said meat removing step.

19. The process for extracting meat as recited in claim 10, wherein said washing step comprises washing said fractured shells and said meat with a solution of water and crab extract.

* * * * *